United States Patent
Auger (10) Patent No.: US 9,415,702 B2
(45) Date of Patent: Aug. 16, 2016

(54) SWIVELLING ASSEMBLY FOR A VEHICLE SEAT

(71) Applicant: Laurent Auger, Trois-Rivières (CA)

(72) Inventor: Laurent Auger, Trois-Rivières (CA)

( * ) Notice: Subject to any disclaimer, the term of this patent is extended or adjusted under 35 U.S.C. 154(b) by 43 days.

(21) Appl. No.: 14/534,435

(22) Filed: Nov. 6, 2014

(65) Prior Publication Data

US 2015/0137572 A1    May 21, 2015

(30) Foreign Application Priority Data

Nov. 19, 2013  (GB) .................................. 1320380.7

(51) Int. Cl.
*A47C 1/00* (2006.01)
*B60N 2/14* (2006.01)
*B60N 2/06* (2006.01)
*B60N 2/24* (2006.01)
*B60N 2/02* (2006.01)

(52) U.S. Cl.
CPC ................ *B60N 2/14* (2013.01); *B60N 2/0232* (2013.01); *B60N 2/06* (2013.01); *B60N 2/062* (2013.01); *B60N 2/245* (2013.01)

(58) Field of Classification Search
CPC ............ B60N 2/14; B60N 2/06; B60N 2/062; B60N 2/245; A47C 3/18
USPC ........... 297/344.21–344.26; 296/65.07, 65.12
See application file for complete search history.

(56) References Cited

U.S. PATENT DOCUMENTS

| | | | |
|---|---|---|---|
| 4,600,239 A * | 7/1986 | Gerstein ................... | A61G 3/06 248/425 |
| 4,733,903 A | 3/1988 | Bailey | |
| 4,792,188 A * | 12/1988 | Kawashima ........... | B60N 2/146 248/418 |
| 4,846,529 A * | 7/1989 | Tulley ................... | B60N 2/0232 297/330 |
| 4,969,685 A * | 11/1990 | Chihaya .................... | A47C 3/18 108/20 |
| 5,000,505 A | 3/1991 | Kawashita et al. | |
| 5,524,952 A * | 6/1996 | Czech ..................... | B60N 2/245 296/65.12 |
| 5,568,960 A * | 10/1996 | Oleson ................... | B60N 2/146 248/418 |
| 5,630,638 A | 5/1997 | Hirasawa et al. | |
| 5,636,884 A | 6/1997 | Ladetto et al. | |
| 5,857,744 A * | 1/1999 | LaPointe .................. | A47C 3/18 297/259.2 |
| 5,890,764 A | 4/1999 | Lee | |
| 6,015,188 A | 1/2000 | Yundt et al. | |
| 6,024,398 A | 2/2000 | Horton et al. | |
| 6,168,234 B1 * | 1/2001 | Haynes ................... | B60N 2/143 297/344.21 |
| 6,457,694 B1 | 10/2002 | Haynes et al. | |
| 6,557,919 B2 * | 5/2003 | Hijikata ................. | B60N 2/062 296/65.07 |

(Continued)

FOREIGN PATENT DOCUMENTS

EP        1873003 A2 *  1/2008  ............... B60N 2/14
GB        525663 A        9/1940

*Primary Examiner* — Laurie K Cranmer (57) ABSTRACT

A swiveling assembly comprising a swivel, the swivel comprising a swivel bottom element and a swivel top element rotatable relative thereto; a gear provided with gear teeth along at least a portion thereof, the gear being mounted to the swivel top element; an actuator operatively coupled to the gear teeth for selectively rotating the gear relative to the swivel bottom element; at least one spacer element mounted to the gear and extending away therefrom; and a seat support mounted to the at least one spacer element so as to be spaced apart from the gear, a vehicle seat being mountable to the seat support. The at least one spacer element raises the seat support so that the vehicle seat is above a doorstep when the swiveling assembly is operatively mounted to a vehicle floor and the vehicle seat is operatively mounted to the swiveling assembly.

18 Claims, 3 Drawing Sheets

(56) References Cited

U.S. PATENT DOCUMENTS

| | | | |
|---|---|---|---|
| 6,572,172 B1 | 6/2003 | Minomiya et al. | |
| 6,981,746 B2 * | 1/2006 | Chung | B60N 2/14 248/425 |
| 7,036,883 B1 * | 5/2006 | Thompson | B60N 2/0224 297/344.24 |
| 7,059,680 B2 * | 6/2006 | Billger | B60N 2/0224 297/217.2 |
| 7,219,961 B2 * | 5/2007 | Priepke | B60N 2/143 296/65.06 |
| 7,334,839 B1 * | 2/2008 | Malerba | B60N 2/002 297/217.1 |
| 7,422,264 B1 * | 9/2008 | Lung | B60N 2/06 296/65.01 |
| 7,614,692 B2 | 11/2009 | Biaud | |
| 8,585,146 B1 * | 11/2013 | Giasson | B60N 2/0747 297/344.1 |
| 8,827,367 B2 * | 9/2014 | Hibi | B60N 2/0232 297/330 |
| 2003/0230920 A1 * | 12/2003 | Itou | B60N 2/06 297/344.21 |
| 2004/0066074 A1 * | 4/2004 | Ovitt | A47C 3/18 297/344.21 |
| 2007/0222267 A1 * | 9/2007 | Tsujimoto | B60N 2/14 297/344.24 |
| 2008/0211284 A1 | 9/2008 | Mutou et al. | |
| 2010/0102611 A1 * | 4/2010 | Bunea | B60N 2/146 297/344.23 |
| 2010/0253123 A1 * | 10/2010 | DeCraene | B60N 2/14 297/344.22 |
| 2011/0018324 A1 * | 1/2011 | Horiguchi | B60N 2/0224 297/344.22 |
| 2013/0161990 A1 * | 6/2013 | Oleson | B64D 11/06 297/344.21 |
| 2014/0028069 A1 * | 1/2014 | Weiss | A47C 3/18 297/344.21 |

* cited by examiner

SWIVELLING ASSEMBLY FOR A VEHICLE SEAT

FIELD OF THE INVENTION

The present invention relates generally to vehicle seats and, more particularly, to a swiveling assembly for a vehicle seat, such as a front car seat, to be swiveled about a generally vertical axis while also allowing conventional linear horizontal slidable movements of the vehicle seat within the vehicle if desired.

BACKGROUND

Adjustable vehicle seat mechanisms are well known in the car industry for providing means to adjust the position and/or ergonomic configuration of the seat the car driver or passenger is sitting in.

The present invention is more particularly concerned with powered vehicle seat mechanisms having adjustment characteristics that are not typically found in factory installed powered seat mechanisms. These powered seat mechanisms of the prior art generally provide a vehicle seat that can be swiveled about a vertical axis, as well as slid linearly horizontally towards the adjacent door bay of the vehicle. Such vehicle seat mechanisms are typically useful for helping a car driver or a car passenger with reduced mobility to enter and exit the vehicle.

The vehicle seat mechanisms of the prior art generally include a powered rotation means for orienting the seat between a forward facing position and a sidewards position oriented towards the adjacent vehicle door, which is normally in an open position when the seat achieves the sidewards position.

The vehicle seat mechanisms of the prior art may further generally include a powered sliding mechanism for imparting a forward or backward horizontal movement to the seat relative to the direction the latter is facing. This horizontal movement is generally longer than what is typically achievable with conventional vehicle power seats for allowing the vehicle seat attached to the vehicle seat mechanism to reach a further distance outside the open door of the vehicle.

While many prior art mechanisms can generally fulfill the main objective of operating a vehicle seat between a forward facing position and a door facing position, they also generally entail one or more of the following disadvantages.

The vehicle seat mechanisms of the prior art are generally represented by relatively expensive assemblies of custom made components, which renders the mechanisms particularly onerous to manufacture, as well as to buy for users having typically low incomes typical of persons with reduced mobility or elderly people.

In addition, there are many constraints to satisfy when retrofitting a swiveling vehicle seat mechanism to a car or other vehicle. Notably, the swiveling mechanism typically needs to raise the vehicle seat to a level clearing the doorstep of the vehicle. However, the swiveling mechanism also needs to be dimensioned such that the vehicle seat remains low enough to that the vehicle seat and any intended user sitting therein remains low enough so as to stay clear of the ceiling of the vehicle passenger compartment. These constraints result in most swiveling seat mechanisms to be adapted for use in a small number of model and brands of vehicles having similar dimensions. To provide swiveling seat mechanisms for a large range of vehicles, there is a need to store many different swiveling seat mechanisms, which increases inventory and manufacturing cost.

Against this background, there exists a need for an improved swiveling assembly for a vehicle seat.

An object of the present invention is to provide such a swiveling assembly for a vehicle seat.

SUMMARY OF THE INVENTION

In a broad aspect, the invention provides a swiveling assembly for supporting a vehicle seat in a vehicle, the vehicle defining a vehicle floor and a doorstep at a predetermined level above the vehicle floor, the swiveling assembly comprising: a swivel, the swivel comprising a swivel bottom element and a swivel top element mounted to the swivel bottom element so as to be rotatable relative thereto about a swivel axis, the swivel bottom element being mountable to the vehicle floor; a gear defining opposed gear top and bottom surfaces and a gear peripheral surface extending therebetween, the gear peripheral surface being provided with gear teeth along at least a portion thereof, the gear also defining a gear axis substantially perpendicular to the gear top surface, the gear being mounted to the swivel top element with the gear axis and the swivel axis substantially collinear with each other and the gear bottom surface facing the swivel top element; an actuator operatively coupled to the gear teeth for selectively rotating the gear relative to the swivel bottom element; at least one spacer element mounted to the gear and extending away from the gear top surface; and a seat support mounted to the at least one spacer element so as to be spaced apart from the gear, the vehicle seat being mountable to the seat support. The at least one spacer element raises the seat support so that the vehicle seat is above the doorstep when the swiveling assembly is operatively mounted to the vehicle floor and the vehicle seat is operatively mounted to the swiveling assembly.

In some embodiments of the invention, a set of spacer elements of different heights from which the at least one spacer element is part of is provided. Selecting spacer elements having different ones of the heights in the set of spacer elements adapts the swiveling assembly to vehicles having different dimensions and configurations.

In some embodiments of the invention, the at least one spacer element is selectively removable from the seat support and the swivel top element to allow replacement of the at least one spacer element with another spacer element from the set of spacer elements having a different one of the heights.

In some embodiments of the invention, an anchor is provided for anchoring the seat support to the vehicle, the anchor including a first anchor element mountable so as to be fixed relative to the vehicle floor and a second anchor element mounted to the seat support, the first and second anchor elements being configured and sized so that when the first anchor element is operatively mounted to the vehicle and the seat support is in a position such that the vehicle seat faces frontwardly, the first and second anchor elements are engaged to each other so as to prevent movements of the second anchor element vertically away from the vehicle floor while allowing rotational movements of the seat support about the swivel axis. For example, the first and second anchor elements are engaged to each other with a dove-tail joint when engaged to each other.

In some embodiments of the invention, the vehicle seat is mounted to the seat support with a pair of telescopic rails, the rails being substantially parallel to each other and each including a substantially elongated rail first member mounted to the seat support and a substantially elongated rail second member mounted to the vehicle seat, the rail first and second members being selectively longitudinally movable relative to each other. In a specific embodiment of the invention, each of the rails includes a substantially elongated rail third member provided between the rail first and second members and slidably mounted thereto so as to be slidable relative thereto.

In some embodiments of the invention, the at least one spacer element includes at least two spacer elements each extending between the gear and the seat support. For example, the at least two spacer elements all have substantially similar configurations and dimensions.

In a specific embodiment of the invention, the at least one spacer element includes 4 spacer elements arranged in a substantially square configuration.

In some embodiments of the invention, the actuator includes an electrical motor, a motor gear and a controller movable between neutral, first direction and second direction configurations, the motor gear engaging the gear teeth so as to rotate the gear when rotating, the electrical motor, motor gear and controller being operatively coupled to each other so that when electrical power is provided to the actuator when the controller is in the neutral configuration, the motor gear is unpowered; when the controller is in the first direction configuration, the motor gear is rotated in a first rotational direction by the electrical motor; and when the controller is in the second direction configuration, the motor gear is rotated in a second rotational direction opposite the first rotational direction by the electrical motor.

In some embodiments of the invention, the actuator is configured so that the motor gear is mechanically locked when the electrical motor is unpowered.

In some embodiments of the invention, the actuator is provided with a rotation limiting element limiting movements of the gear between first and second predetermined positions.

In some embodiments of the invention, the seat support is a substantially plate shaped.

In some embodiments of the invention, the swivel axis is substantially vertical when the swiveling assembly is operatively mounted to the vehicle floor.

In some embodiments of the invention, the gear is a spur gear.

In another broad aspect, the invention provides a swiveling vehicle seat assembly, the swiveling vehicle seat assembly comprising: a swiveling assembly as defined hereinabove; and a vehicle seat mounted to the seat support.

In some embodiments of the invention, the vehicle seat is a power operated vehicle seat having a sitting surface and a seat anchoring base, the seat anchoring base being mounted to the seat support, the sitting surface being movable frontwardly and rearwardly relative to the seat anchoring base.

In yet another broad aspect, the invention provides a method for mounting a vehicle seat in a vehicle having a vehicle floor and a doorstep at a predetermined level above the vehicle floor, the method using a swiveling assembly, the swiveling assembly including a swivel mountable to the vehicle, a seat support for mounting the vehicle seat thereto and a spacer element, the method comprising: selecting a spacer element; mounting the swivel to the vehicle floor; and mounting the seat support to the swivel with the spacer element provided therebetween. Selecting the spacer element includes selecting the spacer element having dimensions such that after mounting the swivel to the vehicle floor and mounting the seat support to the swivel with the spacer element provided therebetween, the vehicle seat is above the predetermined level.

In some embodiments of the invention, the spacer element is selected from a kit of spacer elements having predetermined heights, the predetermined heights including at least two different heights.

In yet another broad aspect, the invention provides a swiveling assembly for supporting a vehicle seat in a vehicle, the swiveling assembly comprising: a swivel, the swivel comprising a swivel bottom element and a swivel top element mounted to the swivel bottom element so as to be rotatable relative thereto about a swivel axis; a gear defining opposed gear top and bottom surfaces and a gear peripheral surface extending therebetween, the gear being provided with gear teeth along at least a portion thereof, the gear also defining a gear axis substantially perpendicular to the gear top surface; at least one spacer element; and a seat support, the vehicle seat being mountable to the seat support. The swivel, gear, at least one spacer element and seat support are mounted to each other so as to form a stack in which the gear axis and the swivel axis are collinear, the seat support being at a top position in the stack, the stack being mountable to the vehicle floor. The swiveling assembly further comprises an actuator operatively coupled to the gear teeth for selectively causing a rotation of the swivel top and bottom elements relative to each other.

In some embodiments of the invention, the at least one spacer element is removably mounted in the stack to allow replacement of the at least one spacer element with another similar spacer element having a different length.

The swiveling assembly may be advantageously usable in combination with the factory installed, power operated vehicle seat of the vehicle in which the swiveling assembly of the present invention is installed. Such factory power seats typically allow at least a powered forward and backward linear horizontal adjustment of the position of the vehicle seat relative to the vehicle.

Advantageously, in the case where the original seat of the vehicle is power operated, the forward and backward position adjustment thereof may be used to forward the seat substantially above the doorstep of the vehicle door to further facilitate a person to take place in or get out of the vehicle seat.

Other objects, advantages and features of the present invention will become more apparent upon reading of the following non-restrictive description of some embodiments thereof, given by way of example only with reference to the accompanying drawings.

DETAILED DESCRIPTION

FIGS. 1 to 6D illustrates various aspects of an embodiment of a swiveling assembly 10 according to the present invention. The swiveling assembly 10 is usable for supporting a vehicle seat 12 in a vehicle (not shown in its entirety in the drawings). As seen for example in FIGS. 6A to 6D, the vehicle defines a vehicle floor 14 and a doorstep 38 at a predetermined level above the vehicle floor 14. The swiveling assembly 10 is useful for modifying the position and orientation of the vehicle seat 12 relative to a vehicle floor 14.

The vehicle seat 12 may be advantageously a conventional power operated vehicle seat 12 that allows a forward and backward horizontal adjustment of the position of the vehicle seat 12. Such vehicle seats 12 have a sitting surface 13 and a seat anchoring base 46, the sitting surface 13 being movable frontwardly and rearwardly relative to the seat anchoring base 46. Yet, as it will also be demonstrated further below, a static, or non-power operated vehicle seat 12 can also be used in some embodiments.

As opposed to swiveling mechanisms for vehicle seats of the prior art having comparable operation and functionalities, the swiveling assembly 10 uses in some embodiments a relatively low number of readily commercially available components, and their particular assembly make for a swiveling assembly 10 that is relative inexpensive to manufacture and commercialize. Thus, more elderly people and persons with reduced mobility, which typically have low incomes, will be able to afford such a convenient mechanism for their vehicle. Also, in some embodiments, the proposed swiveling assembly 10 may be adapted to vehicles having different configurations and dimensions relatively easily.

The term "substantially" is used throughout this document to indicate variations in the thus qualified terms. These variations are variations that do not materially affect the manner in which the invention works and can be due, for example, to uncertainty in manufacturing processes or to small deviations from a nominal value that do not cause significant changes to the invention. These variations are to be interpreted from the point of view of the person skilled in the art.

In addition, directional terminology is used with reference to the swiveling assembly 10 mounted in an upstanding vehicle on a flat surface. Such directional terminology is used for clarity reason and should not be used to limit the scope of the claims unless explicitly mentioned.

Furthermore, the present document uses in numerous occasions the terminology "mounted", such a for example component A is mounted to component B. This terminology should be interpreted as meaning that the components A and B are secured to each other either directly, ie in contact with each other, or indirectly, with for example another component extending therebetween, as long as components A and B are not easily moved away from each other to separate them. Mounting can be achieved in any suitable manner, for example and non-exclusively by welding, soldering, using an adhesive, using fasteners such as screws, nuts and blots, or simply by having portions of components A and B that complementarily shaped to as to be mountable to each other, as would be the case is A and B defined suitably configured and sized threads or the like. It should be noted that in a specific embodiment of the invention that is particularly simple, all instances of A and B are such that A and B are mounted directly to each other, with no intervening components. However, this specific embodiment is not the only embodiment covered by the scope of the claims, unless explicitly mentioned.

Figure 1:
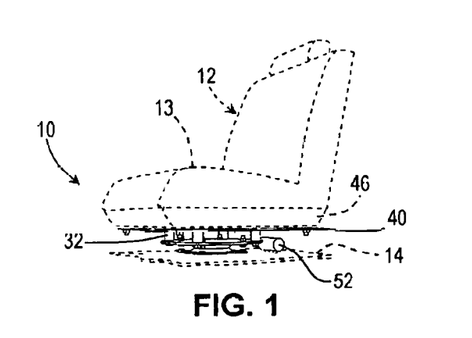
FIG. 1, in a perspective environmental view, illustrates an embodiment of a swiveling assembly for a vehicle seat in accordance with the present invention.
Figure 2:
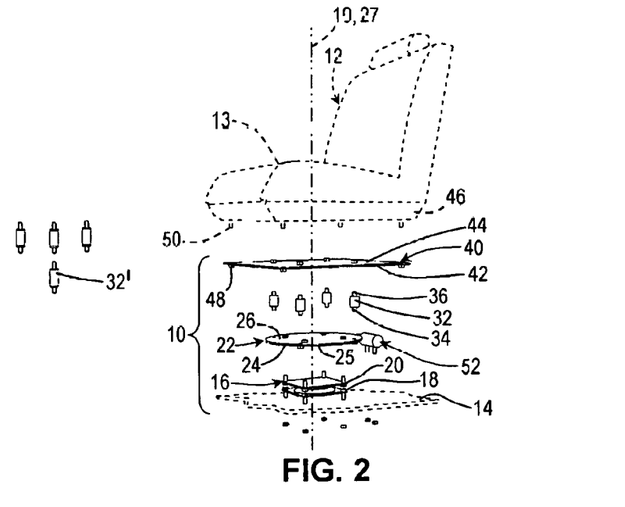
FIG. 2, in an exploded perspective environmental view, illustrates the swiveling assembly of FIG. 1.

Now referring more particularly to FIG. 2, the swiveling assembly 10 comprises a swivel 16, a spur gear 22, an actuator 52, at least one spacer element 32 and a seat support 40. The swivel 16 may be mounted to the vehicle floor 14. The spur gear 22 is mounted to the swivel 16 opposed to the vehicle floor 14. The at least one spacer element 32 is mounted to the spur gear 22 and the seat support 40 is mounted to the at least one spacer element 32 opposed to the spur gear 22.

In some embodiments of the invention, the swivel 16 includes a conventional flat swivel plate. As is well known in the art of conventional office chair manufacturing, flat swivel plates are largely used for providing a free, 360 degree rotational movement to the seat relative to its legs or chair base on casters.

The swivel 16 typically includes a swivel bottom element 18 and a swivel top element 20 mounted to the swivel bottom element 18 so as to be rotatable relative thereto about a swivel axis 19. For example, and non-limitingly, the swivel top element 20 is rotatably mounted on roller bearings about a vertical pivot pin extending upwardly from a central top portion of the swivel bottom element 18. The swivel bottom element 18 is typically mountable to a vehicle floor 14 of the passenger compartment of the vehicle that is normally occupied by the vehicle seat 12 such as typically the driver seat or the front passenger seat.

In some embodiments, the swivel 16 is an industry standard flat swivel plate typically made of metal components and stainless steel roller bearing elements that are having sufficiently robust characteristics for supporting at least the combined weight of a typical vehicle seat and an average size person seating thereon.

The spur gear 22 defines spur gear bottom and top surfaces 24 and 26 and a spur gear peripheral surface 25 extending therebetween. The spur gear peripheral surface 25 is provided with gear teeth (not shown in the drawings for clarity reasons) along at least a portion thereof and defines a spur gear axis 27 substantially perpendicular to the spur gear top surface 26. The spur gear 22 is mounted to the swivel top element 20 with the spur gear axis 27 and the swivel axis 19 substantially collinear with each other and the spur gear bottom surface 24 facing the swivel top element 20. Typically, the spur gear axis 27 is disposed substantially vertically when the swiveling assembly 10 is operatively mounted to the vehicle floor 14. The spur gear 22 may be attached substantially centrally on top of the swivel top element 20 using any suitable attachment means such as nut and screw combinations 28 and 30 respectively, as exemplified in the drawings, a spot-welding process, rivets, or the likes, among others.

As it will be described in details further below, in some embodiments, the spur gear 22 is suitably sized and configured for allowing an actuator 52 including an average size electrical drive motor assembly of a typical vehicle power window that is operatively engaged on the toothed peripheral edge of the spur gear 22, to operate the swiveling assembly 10.

Advantageously, in some embodiments, the spur gear 22 may be a commercially available stock gear having a diametrical dimension of between roughly 8 and 12 inches (between roughly 20 and 30 centimeters). Other diametrical dimensions of the spur gear 22 are also possible. Alternatively, the spur gear 22 may be relatively economically manufactured using a conventional punch press process. Furthermore, this punch press process may define a series of gear teeth on only a quarter of the circumference of the spur gear 22 since the vehicle seat 12 needs only to rotated ninety (90) degree.

Furthermore, the spur gear 22 is typically made of a substantially rigid metal having sufficient thickness to support at least the weight of a conventional vehicle seat 12 in which is sitting an average size person. For example, the spur gear 22 may be represented by an industry standard metal spur gear 22 having a thickness of between roughly ⅛ and ⅜ of an inch (or between 0.30 and 0.95 centimeter). Other thickness dimensions are also possible.

As mentioned hereinabove, the swiveling assembly 10 includes at least one spacer element 32. The at least one spacer element 32 is mounted to the spur gear 22 and extends away from the spur gear top surface 26. In some embodiments, the at least one spacer element 32 includes at least two spacer elements 32, for example four spacer elements 32 arranged in a substantially square configuration, as shown in the drawings. The spacer elements 32 typically all have substantially similar configurations and dimensions. Each spacer element 32 defines a spacer lower end 34 and a spacer upper end 36. In some embodiments of the invention, the spacer lower ends 34 are attached in a spaced apart relationship along the spur gear top surface 26 such that the spacer upper ends 36 extend substantially upwardly relative thereto. As exemplified in the drawings, each spacer lower end 34 may be attached to the gear top surface 26 using, here again, nut and screw combination, a spot-welding process, rivets or the likes.

Figure 4:
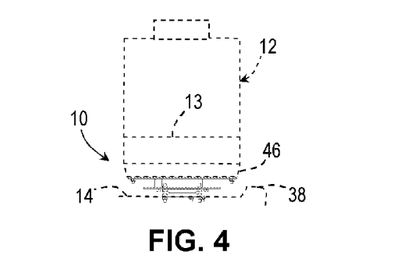
FIG. 4, in a front elevational, environmental view, illustrates the swiveling assembly of FIGS. 1 to 3B.
Figure 5:
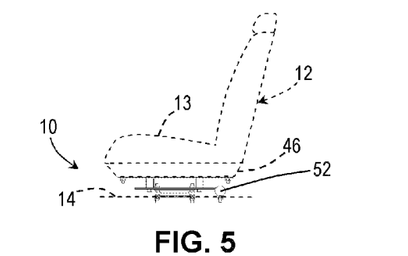
FIG. 5, in a side elevational, environmental view, illustrates the swiveling assembly of FIGS. 1 to 4.

Furthermore, the at least one spacer element 32 raises the seat support 40 so that the vehicle seat 12 is above the doorstep 38 when the swiveling assembly 10 is operatively mounted to the vehicle floor 14 and the vehicle seat 12 is operatively mounted to the swiveling assembly 10, as illustrated for example in FIG. 4. To that effect, in some embodiments, the vertical length, or height, of the spacer elements 32 is dimensioned such that the spacer upper ends 36 substantially coincide with, or are relatively slightly higher than, the relative height of the adjacent doorstep 38 of the vehicle. This particular height dimension is for allowing the substantially horizontal forward and backward movement of the vehicle seat 12 to extend over the doorstep 38 of the vehicle, as it will be demonstrated in details further below.

Likewise the swivel 16 and spur gear 22, the spacer elements 32 are preferably made of a sufficiently rigid metal for supporting an equivalent weight as the formers.

In some embodiments of the invention, as seen in FIG. 2, a set, or kit, of spacer elements 32 and 32' of different heights is provided, from which the at least one spacer element 32 is part of. More specifically, the spacer elements 32 differs in height from the spacer elements 32', which thus constitute alternative spacer elements 32'. Selecting spacer elements 32 and 32' having different ones of the heights in the set of spacer elements 32 and 32' adapts the swiveling assembly 10 to vehicles having different dimensions and configurations. In a specific embodiment, the at least one spacer element 32 is selectively removable from the seat support 40 and the spur gear 22 to allow replacement of the at least one spacer element 32 with another spacer element 32 from the set of spacer elements 32 having a different one of the heights. This is the case for example when the kit of spacer elements 32 is provided and the spacer elements 32 are secured to the other components of the swiveling assembly 10 using removable fasteners, such as nuts and bolts.

As it would be obvious to someone familiar in the art of vehicle powered seat assemblies, in an alternate embodiment of a vehicle seat mechanism according to the present invention (not shown in the drawings), the spacer elements 32 may be replaced with a single spacer element, for example consisting of a relatively short tubular member disposed vertically and defining a vertical length, or height, substantially equivalent to the height of the spacer elements 32. The tubular member may have a diameter that is slightly smaller than the diameter of the spur gear 22 and be mounted on the spur gear top surface 26 similarly to the spacer elements 32.

The swiveling assembly 10 further includes the seat support 40. For example, the seat support 40 is a substantially plate shaped and substantially planar. Such a seat support 40 is typically disposed in a horizontal plane, thus defining a seat support plate bottom surface 42 and a seat support plate top surface 44. The seat support 40 is sufficiently dimensioned in the horizontal plane to encompass the seat anchoring base 46 of the vehicle seat 12.

The seat support 40 is mounted to the spacer elements 32 so as to be spaced apart from the spur gear 22 and the vehicle seat 12 is mountable to the seat support 40. To that effect, in some embodiments, the seat support plate bottom surface 42 is attached substantially centrally on the plurality of spacer upper ends 36 using a similar attachment means as between the spacer lower ends 34 and the spur gear top surface 26.

The seat support plate top surface 44 defines a plurality, but typically four spaced apart seat anchors 48 that are suitably positioned for anchoring thereto the seat anchoring base 46 of the vehicle seat 12. Typically, the seat anchors 48 may be represented by threaded anchoring bores extending vertically through the seat support plate top surface 44 for allowing anchoring thereto the vehicle seat 12 using a suitable number of seat anchoring screws 50. Other types of seat anchors 48 are also possible such as, for example, a welding process, rivets or the likes.

The actuator 52 is operatively coupled to the gear teeth for selectively rotating the spur gear 22 relative to the swivel bottom element 18. The actuator 52 is therefore provided for selectively rotating in a first or a second rotational direction the assembly generally represented by the seat support 40, the spur gear 22 and swivel top element 20.

Figure 3A:
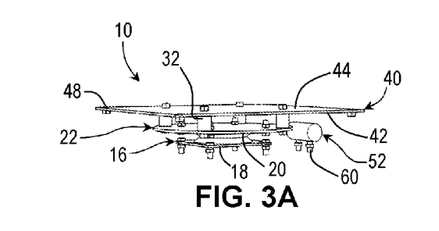
FIG. 3A, in a perspective view, illustrates the swiveling assembly of FIGS. 1 and 2.
Figure 3B:
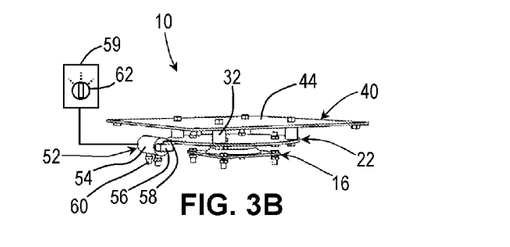
FIG. 3B, in an alternative perspective view, illustrates the swiveling assembly of FIGS. 1 to 3A.

Referring to FIG. 3B, in some embodiments, the actuator 52 includes an electrical motor 54, a motor gear 58 and a controller 59 movable between neutral, first direction and second direction configurations. The motor gear 58 engages the gear teeth so as to rotate the spur gear 22 when rotating. In some embodiments, a gear box 56 is provided between the electrical motor 54 and the motor gear 58. The electrical motor 54 and/or the gear box 56 may be attached to the vehicle floor 14 using, for example, integrated nut and screw combinations 60, as exemplified in the drawings, C-shaped clips and screw combinations, or the likes. The actuator 52 is positioned such that the motor gear 58 thereof is operatively engaged with a peripheral edge portion of the spur gear 22.

The electrical motor 54, motor gear 58 and controller 59 are operatively coupled to each other so that when electrical power is provided to the actuator 52:
when the controller 59 is in the neutral configuration, the motor gear 58 is unpowered;
when the controller 59 is in the first direction configuration, the motor gear 58 is rotated in the first rotational direction by the electrical motor 54; and
when the controller 59 is in the second direction configuration, the motor gear 58 is rotated in the second rotational direction, opposite the first rotational direction, by the electrical motor 54.

The actuator 52 is therefore selectively operable in the first rotational direction wherein the seat support 40 and, thus, the vehicle seat 12 attached thereon, is rotated towards the adjacent vehicle doorstep 38, and in the second rotational direction wherein the seat support plate is rotated opposite the first rotational direction, typically towards a frontward facing direction relative to the vehicle.

In some embodiments, the actuator 52 is represented by a commonly available power window drive motor assembly including the gear box 56. Conveniently, power window drive motor assemblies are such that the motor gear 58 is mechanically locked when the electrical motor 54 is unpowered. In some embodiments, the actuator 52 is provided with a rotation limiting element limiting movements of the spur gear 22 between first and second predetermined positions, typically ones in which the vehicle seat 12 faces towards the front and the side of the vehicle. Once again, power window drive motor assemblies typically include limit switches in the gear box 56 that allow to easily achieve this functionality Indeed, as it would be known for someone familiar with the art of vehicle power windows, such a drive motor assembly has two limit switches integrated within the gear box 56 which are typically suitably electrically coupled in series between the electrical motor 54 and the remote window control switch integrated along the inner side panel of a vehicle door. These limit switches cut off the power to the electrical motor 54 once the window has reached its lower or upper limits. In the present invention, this feature is advantageously used for limiting the angular position of the vehicle seat 12 in one of two positions, for example a frontward direction towards the front of the vehicle and a sidewards direction towards the adjacent doorstep 38.

As it would be further known for someone familiar with the art of vehicle power windows, the internal gear configuration of the gear box 56 of a typical power window drive motor assembly is such that the rotation of the motor gear 58 is intrinsically mechanically locked when the electrical power is cut off to the electrical motor 54. Thus, when no power is applied to the electrical motor 54, the spur gear 22 cannot be forcibly rotated.

In the present invention, this feature is advantageously used for locking the angular position of the vehicle seat 12 in one of two positions, namely a frontward facing direction towards the front of the vehicle and a sidewards facing direction towards the adjacent doorstep 38.

For example, the controller 59 includes a selector switch 62. The selector switch 62 is preferably represented by a standard three position selectors switch 62 operable in selector switch first, center, and second positions, corresponding respectively to the neutral, first direction and second direction configurations of the controller 59. In FIG. 3B, the selector switch 62 is illustrated in full lines in the selector switch center position. As it would be known to someone familiar with the art of power seat control switches, the three position selector switch is suitably electrically coupled in series between the electrical motor 54 and a twelve volts DC power source on the vehicle through a multiple conductor electrical cable.

It is to be noted that, by suitably electrically coupling the selector switch 62 with the electrical motor 54, the angle, or angular range of rotational travel of the spur gear 22 is only possible between two predefined angular limits thereof by the two internal limit switches of the gear box 56.

As is common with vehicle power seat controls, the selector switch 62 may be represented by conventional control switch actuable by a relatively small lever having two distally opposite momentary positions, and a self-return, or spring biased central resting position. Furthermore, the selector switch 62 may typically be located along a side surface portion of the seat anchoring base 46 (not seen in FIG. 3B) facing the adjacent door. However, other positions of the selector switch 62 are also possible.

A mode of use and operation of the swiveling assembly 10 will now be described. Before being used by the vehicle driver or passenger, the swiveling assembly 10 is first mounted in the vehicle. In embodiments in which the spacer elements 32 are selectable between spacer elements 32 of different heights, the spacer elements 32 are selected to fit the vehicle in which the swiveling assembly 10 is to be installed. More specifically, selecting the spacer element(s) 32 includes selecting the spacer element(s) 32 having dimensions such that after mounting the swivel 16 to the vehicle floor 14 and mounting the seat support 40 to the swivel 16 with the spacer element 32 provided therebetween, the vehicle seat 12 is above the doorstep 38. Then, the swivel 16 is mounted to the vehicle floor 14 and the seat support 40 is mounted to the swivel 16 with the spacer element(s) 32 provided therebetween. Also, the spur gear 22 is mounted between the spacer element(s) 32 and the swivel 16. The order in which these operations are performed may differ between embodiments. In other words, it may be advantageous in some embodiments to assemble the whole swiveling assembly 10 separately before mounting in the vehicle, or it may be advantageous to mount the swivel 16 in the vehicle and the mount the other components of the swiveling assembly 10 one after the other.

Then, the swiveling assembly 10 is ready for use as follows. At first, the vehicle seat 12 is facing frontward relative to the vehicle. Thus, as illustrated in a front elevational view in FIG. 6A, the vehicle seat 12 is typically longitudinally aligned substantially parallel to the adjacent doorstep 38, with the associated vehicle door in an open position.

Figure 6A:
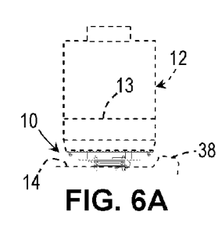
FIG. 6A, in a front elevational, environmental view, illustrates the swiveling assembly of FIGS. 1 to 5 with the vehicle seat supported thereby facing frontwardly.
Figure 6B:
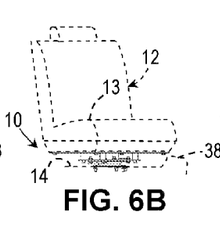
FIG. 6B, in a front elevational, environmental view, illustrates the swiveling assembly of FIGS. 1 to 6A with the vehicle seat supported thereby facing an orientation intermediate front and side orientations.
Figure 6C:
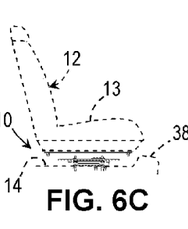
FIG. 6C, in a front elevational, environmental view, illustrates the swiveling assembly of FIGS. 1 to 6B with the vehicle seat supported thereby facing sidewardly.

When the selector switch 62 (only seen in FIG. 3B) is selectively actuated in the selector switch first position, the vehicle seat 12 is automatically rotated towards the adjacent vehicle door until it is substantially perpendicular to the longitudinal orientation of the vehicle, as illustrated successively in FIGS. 6B and 6C. When the selector switch 62 is selectively actuated in the selector switch center position, the electrical motor 54 is deactivated.

Figure 6D:
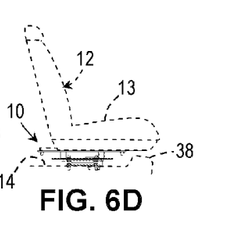
FIG. 6D, in a front elevational, environmental view, illustrates the swiveling assembly of FIGS. 1 to 6C with the vehicle seat supported thereby facing sidewardly and sled over a doorstep of the vehicle in which the swiveling assembly is mounted.

Advantageously, in the case where the vehicle seat 12 is power operated, the forward and backward position adjustment thereof may be used to forward the vehicle seat 12, and more specifically the sitting surface 13 thereof, substantially above the doorstep 38 of the vehicle door to further facilitate a person to take place in, or get out of, the vehicle seat 12, as illustrated in FIG. 6D.

Finally, with the vehicle seat 12 positioned back substantially above the swivel 16, the rotation selector switch 62 may be selectively actuated in the rotation selector switch second position, which automatically rotates the vehicle seat 12 back towards the front of the vehicle until it is substantially parallel with the longitudinal orientation of the vehicle, as illustrated in FIG. 6A.

It should be noted that in alternative embodiments of the invention, the swivel 16, spur gear 22, at least one spacer element 32 and seat support 40 are mounted to each other in alternative manners so as to form a stack in which the spur gear axis 27 and swivel axis 19 are collinear, the seat support 40 being at a top position in the stack, the stack being mountable to said vehicle floor. In these embodiments, the actuator 52 is operatively coupled to the gear teeth for selectively causing a rotation of the swivel top and bottom elements 20 and 18 relative to each other. In other words, the order in which the components of the swiveling assembly 10 are mounted to each other, when starting from the vehicle floor 14 and going upwardly, may differ to achieve the functionality of the swiveling assembly 10.

For example, the spacer elements 32 may be provided between the vehicle floor 14 and the swivel 16, and the spur gear 22 may be mounted between the seat support 40 and the swivel 16. In another example, the spur gear 22 is mounted between the spacer elements 32 and the swivel 16, and the seat support 40 is directly mounted to the swivel 16. In these embodiments, the electrical motor 54 is typically mounted to the seat support 40 or the vehicle seat 12 so that rotating the motor gear 58 moves the motor gear 58 along the spur gear 22, resulting in rotation of the vehicle seat 12. The person skilled in the art will appreciate that other permutations of the order of the components of the swiveling assembly 10 will result in a working swiveling assembly.

Also, in alternative embodiments, another type of gear is used instead of a spur gear 22. For example, a gear having teeth on its bottom or top surface may be used if the motor gear 58 is suitably oriented. In another example, a gear having teeth that are angled relative to the rotation axis of the gear may be used.

Figure 8A:
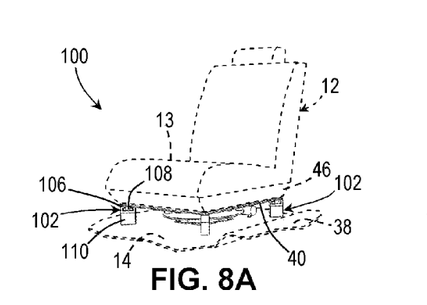
FIG. 8A, in an environmental perspective view, illustrates an alternate embodiment of a swiveling assembly for a vehicle seat according to the present invention, the swiveling assembly including anchors as seen in FIGS. 7A and 7B, the swiveling assembly being here shown in a forward facing orientation relative to the vehicle, and with anchors thereof in the engaged configuration.
Figure 8B:
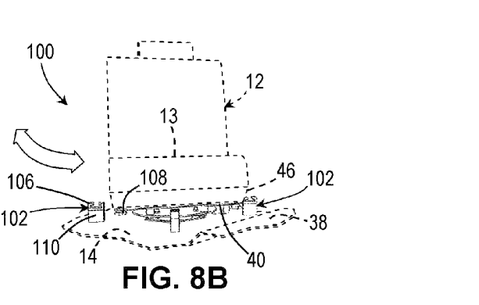
FIG. 8B, in an environmental perspective view, illustrates the swiveling assembly of FIG. 8A, here shown in an intermediate orientation between a forward facing orientation and a sidewards facing orientation relative to the vehicle, and with anchors thereof in the disengaged configuration.

Now referring to FIGS. 8A and 8B, there is illustrated an alternate embodiment of a swiveling assembly 100 according to the present invention. In the presently described embodiment, the swiveling assembly 100 is substantially similar to the first embodiment of the swiveling assembly 10 described above, with the exception that it further includes an anchor 102. The anchor 102 is for better securing the seat support 40 to the vehicle floor 14 than can be solely provided by the swivel 16.

Typically, a plurality of anchors 102 is provided for example four (4) anchors 102 disposed in a radially equidistantly spaced apart relationship, with each anchor 102 being for example positioned substantially vertically in register with the original anchoring position of the vehicle seat 12 with the vehicle floor 14.

Figure 7A:
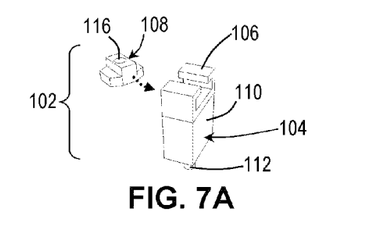
FIG. 7A, in an environmental perspective view, illustrates an anchor usable with the swiveling assembly of FIGS. 1 to 6D, here shown in a disengaged configuration.
Figure 7B:
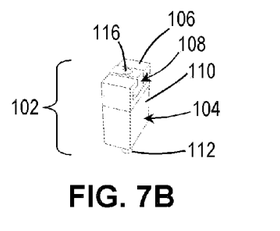
FIG. 7B, in an environmental perspective view, the anchor FIG. 7A, here shown in an engaged configuration.

Referring to FIGS. 7A and 7B, each anchor 102 includes a first anchor element 104 mountable so as to be fixed relative to the vehicle floor 14. To that effect, the first anchor element 104 may be fixed directly to the vehicle floor 14, as seen in FIGS. 8A and 8B, or fixed to a reinforcing plate 302 seen in FIG. 10 and described in further details hereinbelow. A second anchor element 108 is mounted to the seat support 40, typically on the underside thereof. The first and second anchor elements 104 and 108 are configured and sized so that when the first anchor element 104 is operatively mounted to the vehicle and the seat support 40 is in a position such that the vehicle seat 12 faces frontwardly, the first and second anchor elements 104 and 108 are engaged to each other so as to prevent movements of the second anchor element 108 vertically away from the vehicle floor 14 while allowing rotational movements of the seat support 40 about the swivel axis 19 (not seen in FIGS. 7A to 8B).

Figure 10:
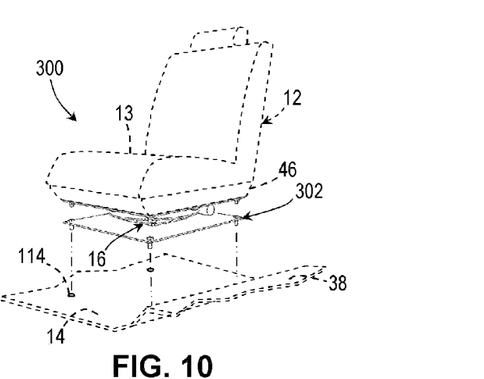
FIG. 10, in an environmental perspective view, illustrates yet another alternate embodiment of a swiveling assembly for a vehicle seat according to the present invention, the swiveling assembly including including a reinforcement floor plate, the swiveling assembly being here shown in a forward facing orientation relative to the vehicle.

For example, and non-limitingly, the first and second anchor elements 104 and 108 are engaged to each other with a dove-tail joint when engaged to each other. To that effect, in a specific embodiment of the invention, the first anchor element 104 includes a substantially C-shaped channel member 106, oriented with the longitudinal axis of the channel thereof substantially horizontal, and the second anchor element 108 takes the form of a complementarily shaped T-shaped member. The C-shaped channel member 106 is disposed such that its transverse open end, between the two branches of the "C", is directed upwardly and is extended downwardly by a member distal bottom end portion 110. A threaded stud 112 extends perpendicularly downwardly relative to a member distal bottom end portion 110 for threadedly engaging the original seat anchoring threaded bore 114 (as illustrated in FIG. 10) provided in the vehicle floor 14.

The second anchor element 108 is dimensioned and sized for freely slidably engaging the channel of the C-shaped channel member 106. The upwardly extending distal end of the second anchor element 108 defines a T-shaped member threaded bore 116 that is sized and configured for engaging a seat support plate threaded stud (not shown in the drawings) extending substantially perpendicularly downwardly from to the seat support 40 at a position that is substantially in register with the original seat anchoring screws 50 (only seen for example in FIG. 2) of the vehicle seat 12.

The typically four (4) seat anchoring screws 50 and corresponding seat anchoring bores 114 often define a rectangular configuration rather than a true square, the swiveling assembly 100 of the presently described embodiment, may thus not be able to fully rotate ninety degree from the frontward facing orientation towards the adjacent doorstep 38. Indeed, once the vehicle seat 12 is rotated, the second anchor element 108 would not be properly aligned for a slidable engagement with the adjacent C-shaped channel member 106. Nevertheless, the vehicle seat 12 will be able to sufficiently rotate towards the doorstep to provide a person with a substantially facilitated operation of taking place and getting out of the vehicle seat 12.

Furthermore, as it will be rendered obvious through the description of an alternate embodiment of the swiveling assembly 300 further below, by using the anchors 102 in combination with a reinforcing plate 302, it will be possible to position the anchors 102 such that they are equidistantly spaced apart in a substantially square configuration, thus allowing a full ninety degree rotation of the vehicle seat 12.

Each pair of C-shaped channel member 106 and second anchor element 108 forming an anchor 102 are substantially angularly aligned with one another such that when the vehicle seat 12 is in a normal or frontward orientation relative to the vehicle, each second anchor element 108 is fully slidably engaged in its corresponding C-shaped channel member 106. To facilitate the freely slidable engagement of the second anchor element 108 into the C-shaped channel member 106, the longitudinal distal ends of the second anchor element 108 are typically at least slightly tapered, as best illustrated in FIG. 7A.

Thus, the anchors 102, in addition to the inherent anchoring force provided by the swivel 16, advantageously provide a relatively stronger mechanical bond between the vehicle seat 12 and the vehicle than prior art vehicle seat mechanisms. Indeed, these vehicle seat mechanisms of the prior art generally provide a single mechanical link between the vehicle seat 12 and the vehicle through the central pivot pin of their rotational assembly. In other words, these vehicle seat mechanisms mainly rely on the seat belt system of the concerned vehicle seat to absorb most of the force of a frontal impact with another vehicle or obstacle, and do not provide much support in the case of a rear or lateral impact to the vehicle.

Figure 9:
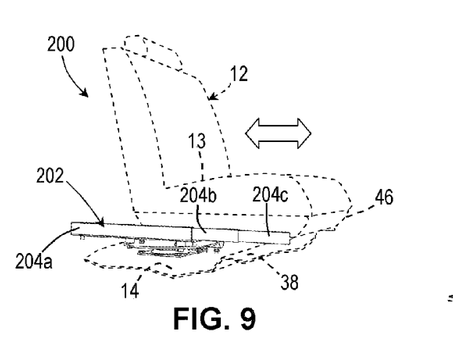
FIG. 9, in an environmental perspective view, illustrates another alternate embodiment of a swiveling assembly for a vehicle seat according to the present invention, here shown in a sidewards, or side door facing, orientation relative to the vehicle, and with telescopic rails thereof in an extended configuration.

Now referring to FIG. 9, there is illustrated yet another alternate embodiment of a swiveling assembly 200 according to the present invention. In the presently described embodiment, the swiveling assembly 200 is substantially similar to the first or second embodiment of a swiveling assembly 10 or 100 respectively, as described above, with the exception that it further includes a pair of telescopic rails 202 (only one of which is seen in the drawings) that are substantially parallel to each other and mounted to the seat support 40. The telescopic rails 202 may be installed on a conventional or static vehicle seat (e.g. a vehicle seat that is not power operated), or a powered vehicle seat already provided with a forward and backward adjustment mechanism.

The pair of telescopic rails 202 is usable for providing a forward and backward position adjustment mechanism of the vehicle seat 12 having requiring a relatively longer range than the factory installed mechanism. The telescopic rails 202 may be advantageously used in vehicles having typically an above average distance separating the normal position of the vehicle seat 12 relative to the doorstep 38 of the vehicle door that can be found in large vehicles such as pickup trucks, SUVs, and minivans.

As exemplified in the drawing, each telescopic rail 202 may include a substantially elongated rail first member 204a mounted to the seat support 40 and a substantially elongated rail second member 204c mounted to the vehicle seat 12, the rail first and second members 204a and 204c being selectively longitudinally movable relative to each other. In a specific embodiment of the invention, each of the rails 202 includes a substantially elongated rail third member 204b provided between the rail first and second members 204a and 204c and slidably mounted thereto so as to be slidable relative thereto. The rail first, second and third members 204a, 204c and 204b may take the form of three (3) coaxially engaged C-shaped elongated channel members, wherein the outermost C-shaped elongated channel member is the rail first member 204a and the innermost C-shaped elongated channel member is the rail second member 204c. The drive motor mechanism and control switches that allow movement of the vehicle seat 12 by extending and retracting the telescopic rail 202 may be identical to a typical factory assembled drive mechanism for power seats.

Now referring to FIG. 10, there is illustrated another alternate embodiment of a swiveling assembly 300 according to the present invention. In the presently described embodiment, the swiveling assembly 300 is substantially similar to the first, second and third embodiment of a swiveling assembly 10, 100 or 200 respectively, as described above, with the exception that it further includes a reinforcing plate 302. The reinforcing plate 302 is adapted to be mounted between the original seat anchoring threaded bores 114 typically embedded in structural frame members under the vehicle floor 14, and the other components of one of the embodiments described above. Thus, the reinforcing plate 302 provides a relatively stronger and stable base on which to attach the swivel 16 and, selectively, the anchors 102, compared to the typically thin sheet of metal that is generally found centrally under the vehicle seat 12.

The reinforcing plate 302 may be substantially square or rectangular in configuration and be represented by sufficiently rigid metal plate for supporting the combined weight of the other components of the swiveling assembly 10, 100 or 200 as described in the previous embodiments, additionally to a typical vehicle seat 12, and an average size person seated thereon. Furthermore, the reinforcing plate 302 may be typically planar, but another configuration than planar is also possible to suitably conform to shape irregularities and protuberances along the vehicle floor 14. For example, the reinforcing plate 302 may be represented by an eight (⅛) of an inch (or 0.30 cm) thick metal plate.

Still furthermore, as explained further above, the reinforcing plate 302 may be advantageously used for allowing the anchors 102 to be positioned in a substantially equidistantly spaced apart configuration such that the vehicle seat 12 may rotate a full ninety degree between a frontward facing orientation and a sidewards orientation towards the doorstep 38.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. A swiveling assembly for supporting a vehicle seat in a vehicle, the vehicle defining a vehicle floor and a doorstep at a predetermined level above the vehicle floor, said swiveling assembly comprising:

a swivel, said swivel comprising a swivel bottom element and a swivel top element mounted to said swivel bottom element so as to be rotatable relative thereto about a swivel axis, said swivel bottom element being mountable to the vehicle floor;

a swiveling assembly gear defining opposed gear top and bottom surfaces and a gear peripheral surface extending therebetween, said swiveling assembly gear also defining a gear axis substantially perpendicular to said gear top surface, said swiveling assembly gear being mounted to said swivel top element with said gear axis and said swivel axis substantially collinear with each other and said gear bottom surface facing said swivel top element;

an actuator operatively coupled to said swiveling assembly gear for selectively rotating said swiveling assembly gear relative to said swivel bottom element;

at least one spacer element mounted to said swiveling assembly gear and extending away from said gear top surface; and a seat support mounted to said at least one spacer element so as to be spaced apart from said swiveling assembly gear, the vehicle seat being mountable to said seat support;

whereby said at least one spacer element raises said seat support so that the vehicle seat is above the doorstep when said swiveling assembly is operatively mounted to the vehicle floor and the vehicle seat is operatively mounted to said swiveling assembly;

said swiveling assembly further comprising alternative spacer elements differing in heights from said at least one spacer element, whereby replacing said at least one spacer element with one of said alternative spacer elements adapts said swiveling assembly to vehicles having different dimensions and configurations.

2. A swiveling assembly as defined in claim 1, wherein said at least one spacer element is selectively removable from said seat support and swiveling assembly gear to allow replacement of said at least one spacer element with said one of said alternative spacer elements.

3. A swiveling assembly as defined in claim 1, further comprising an anchor for anchoring said seat support to the vehicle, said anchor including a first anchor element mountable so as to be fixed relative to the vehicle floor and a second anchor element mounted to said seat support, said first and second anchor elements being configured and sized so that when said first anchor element is operatively mounted to the vehicle and said seat support is in a position such that the vehicle seat faces frontwardly, said first and second anchor elements are engaged to each other so as to prevent movements of said second anchor element vertically away from the vehicle floor while allowing rotational movements of said seat support about said swivel axis.

4. A swiveling assembly as defined in claim 3, wherein said first and second anchor elements are engaged to each other with a dove-tail joint when engaged to each other.

5. A swiveling assembly as defined in claim 1, wherein the vehicle seat is mounted to said seat support with a pair of telescopic rails, said rails being substantially parallel to each other and each including a substantially elongated rail first member mounted to said seat support and a substantially elongated rail second member mounted to the vehicle seat, said rail first and second members being selectively longitudinally movable relative to each other.

6. A swiveling assembly as defined in claim 5, wherein each of said rails includes a substantially elongated rail third member provided between said rail first and second members and slidably mounted thereto so as to be slidable relative thereto.

7. A swiveling assembly as defined in claim 1, wherein said at least one spacer element includes at least two spacer elements each extending between said swiveling assembly gear and said seat support.

8. A swiveling assembly as defined in claim 7, wherein said at least two spacer elements all have substantially similar configurations and dimensions.

9. A swiveling assembly as defined in claim 1, wherein said at least one spacer element includes 4 spacer elements arranged in a substantially square configuration.

10. A swiveling assembly as defined in claim 1, wherein said actuator includes an electrical motor, a motor gear and a controller movable between neutral, first direction and second direction configurations, said motor gear engaging said swiveling assembly gear so as to rotate said swiveling assembly gear when rotating, said electrical motor, motor gear and controller being operatively coupled to each other so that when electrical power is provided to said actuator when said controller is in said neutral configuration, said motor gear is unpowered;

when said controller is in said first direction configuration, said motor gear is rotated in a first rotational direction by said electrical motor; and when said controller is in said second direction configuration, said motor gear is rotated in a second rotational direction opposite said first rotational direction by said electrical motor.

11. A swiveling assembly as defined in claim 10, wherein said actuator is configured so that said motor gear is mechanically locked when said electrical motor is unpowered.

12. A swiveling assembly as defined in claim 10, wherein said actuator is provided with a rotation limiting element limiting movements of said swiveling assembly gear between first and second predetermined positions.

13. A swiveling assembly as defined in claim 1, wherein said seat support is a substantially plate shaped.

14. A swiveling assembly as defined in claim 1, wherein said swivel axis is substantially vertical when said swiveling assembly is operatively mounted to the vehicle floor.

15. A swiveling assembly as defined in claim 1, wherein said swiveling assembly gear is a spur gear.

16. A swiveling vehicle seat assembly, said swiveling vehicle seat assembly comprising:
a swiveling assembly as defined in claim 1; and
a vehicle seat mounted to said seat support.

17. A swiveling vehicle seat assembly as defined in claim 16, wherein said vehicle seat is a power operated vehicle seat having a sitting surface and a seat anchoring base, said seat anchoring base being mounted to said seat support so that said sitting surface is movable frontwardly and rearwardly relative to said swiveling assembly.

18. A swiveling assembly for supporting a vehicle seat in a vehicle, the vehicle defining a vehicle floor and a doorstep at a predetermined level above the vehicle floor, said swiveling assembly comprising:
a swivel, said swivel comprising a swivel bottom element and a swivel top element mounted to said swivel bottom element so as to be rotatable relative thereto about a swivel axis, said swivel bottom element being mountable to the vehicle floor;
a swiveling assembly gear defining opposed gear top and bottom surfaces and a gear peripheral surface extending therebetween, said swiveling assembly gear also defining a gear axis substantially perpendicular to said gear top surface, said swiveling assembly gear being mounted to said swivel top element with said gear axis and said swivel axis substantially collinear with each other and said gear bottom surface facing said swivel top element;
an actuator operatively coupled to said swiveling assembly gear teeth for selectively rotating said swiveling assembly gear relative to said swivel bottom element;
at least one spacer element mounted to said swiveling assembly gear and extending away from said gear top surface; and
a seat support mounted to said at least one spacer element so as to be spaced apart from said swiveling assembly gear, the vehicle seat being mountable to said seat support;
an anchor for anchoring said seat support to the vehicle, said anchor including a first anchor element mountable so as to be fixed relative to the vehicle floor and a second anchor element mounted to said seat support, said first and second anchor elements being configured and sized so that when said first anchor element is operatively mounted to the vehicle and said seat support is in a position such that the vehicle seat faces frontwardly, said first and second anchor elements are engaged to each other so as to prevent movements of said second anchor element vertically away from the vehicle floor while allowing rotational movements of said seat support about said swivel axis, said first and second anchor elements being engaged to each other with a dove-tail joint when engaged to each other;

whereby said at least one spacer element raises said seat support so that the vehicle seat is above the doorstep when said swiveling assembly is operatively mounted to the vehicle floor and the vehicle seat is operatively mounted to said swiveling assembly.

* * * * *